(12) United States Patent
Wang et al.

(10) Patent No.: US 11,947,215 B2
(45) Date of Patent: Apr. 2, 2024

(54) BACKLIGHT MODULE, DISPLAY DEVICE, AND METHOD OF ASSEMBLING BACKLIGHT MODULE

(71) Applicant: AmTRAN Technology Co., Ltd., New Taipei (TW)

(72) Inventors: Chih Kuei Wang, New Taipei (TW); Min Hung Cheng, Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 18/171,383

(22) Filed: Feb. 20, 2023

(65) Prior Publication Data

US 2024/0053633 A1 Feb. 15, 2024

(30) Foreign Application Priority Data

Aug. 15, 2022 (TW) ................................ 111130657

(51) Int. Cl.
*G02F 1/00* (2006.01)
*G02F 1/13357* (2006.01)

(52) U.S. Cl.
CPC .. *G02F 1/133603* (2013.01); *G02F 1/133605* (2013.01); *G02F 1/133606* (2013.01); *G02F 1/133608* (2013.01)

(58) Field of Classification Search
CPC ....... G02F 1/133603; G02F 1/133605–133608
See application file for complete search history.

(56) References Cited

U.S. PATENT DOCUMENTS

2007/0279937 A1* 12/2007 Hsiao ................ G02F 1/133603 362/613
2013/0044462 A1 2/2013 Cheng
2015/0277180 A1* 10/2015 Seo .................. G02F 1/133602 349/58
2015/0338571 A1* 11/2015 Jun ..................... G02B 6/0088 362/97.1
2017/0097462 A1 4/2017 Lee et al.
2017/0160591 A1* 6/2017 Cho ................. G02F 1/133606
(Continued)

FOREIGN PATENT DOCUMENTS

CN 103162182 A 6/2013
CN 106154646 A 11/2016
(Continued)

*Primary Examiner* — Gerald J Sufleta, II
(74) *Attorney, Agent, or Firm* — CKC & Partners Co., LLC

(57) ABSTRACT

A backlight module includes a housing, a light source, at least one supporting member, a diffuser plate, and an optical film. The housing includes a backplate portion, a sidewall portion, and a panel mounting platform. The sidewall portion is arranged along a periphery of the backplate portion. The panel mounting platform is connected and bent relative to the sidewall portion, such that the panel mounting platform, the sidewall portion, and the backplate portion form a concavity. The light source is disposed on the backplate portion. The supporting member is disposed in the housing and at least partially located in the concavity. The optical film and the diffuser plate are stacked on the supporting member. The supporting member has a reflective incline structure that is configured to directly reflect light traveling towards an inner side surface of the housing towards the diffuser plate.

15 Claims, 5 Drawing Sheets

(56) References Cited

U.S. PATENT DOCUMENTS

| | | | | |
|---|---|---|---|---|
| 2017/0184917 | A1* | 6/2017 | Yi | G02F 1/133603 |
| 2020/0064676 | A1 | 2/2020 | Liang | |
| 2020/0209687 | A1* | 7/2020 | Yan | G02F 1/133308 |
| 2021/0215965 | A1* | 7/2021 | Isobe | G02F 1/133317 |
| 2022/0221760 | A1* | 7/2022 | Dai | G02F 1/133605 |
| 2022/0373840 | A1* | 11/2022 | Song | G02F 1/133606 |

FOREIGN PATENT DOCUMENTS

| | | | |
|---|---|---|---|
| CN | 109856838 | A | 6/2019 |
| CN | 211905923 | U | 11/2020 |
| CN | 112764253 | A | 5/2021 |
| CN | 215416206 | U | 1/2022 |
| CN | 114859594 | A | 8/2022 |
| JP | 2008027884 | A | 2/2008 |
| JP | 2013196931 | A | 9/2013 |
| TW | 201044077 | A | 12/2010 |
| WO | 2014129369 | A1 | 8/2014 |
| WO | 2022012588 | A1 | 1/2022 |

* cited by examiner

BACKLIGHT MODULE, DISPLAY DEVICE, AND METHOD OF ASSEMBLING BACKLIGHT MODULE

CROSS-REFERENCE TO RELATED APPLICATION

This application claims priority to Taiwan Application Serial Number 111130657, filed Aug. 15, 2022, which is herein incorporated by reference.

BACKGROUND

Technical Field

The present disclosure relates to a backlight module, a display device, and a method of assembling a backlight module.

Description of Related Art

In recent years, thin Mini LED backlight modules have become one of the key development projects in the display field. However, in terms of the thinning mechanism of the Mini LED backlight module, the existing product designs often have problems of high cost and difficult assembly. For example, some products are designed with aluminum extruded front frame. However, the aluminum extruded front frame has a complex structure and high manufacturing cost, and the assembly process require bending the reflective sheet from the backplate to the aluminum extruded front frame to form a reflective slope, which is likely to cause problems such as deformation or breakage of the reflective sheet. In addition, some products use screws to lock the frame, which is not only inconvenient to assemble, but also affects the appearance of the product. It needs to add appearance parts to cover the screws.

SUMMARY

An aspect of the disclosure is to provide a backlight module with a simple structure and easy assembly.

According to an embodiment of the disclosure, the backlight module includes a housing, a light source, at least one supporting member, a diffuser plate, and an optical film. The housing includes a backplate portion, a sidewall portion, and a panel mounting platform. The sidewall portion is arranged along a periphery of the backplate portion, and the panel mounting platform is connected to and bent relative to the sidewall portion, such that the panel mounting platform, the sidewall portion, and the backplate portion form a concavity. The light source is disposed on the backplate portion of the housing. The supporting member is disposed in the housing and at least partially located in the concavity. The optical film and the diffuser plate are directly stacked on the support member. The supporting member has a reflective incline structure. The reflective incline structure is configured to directly reflect light traveling towards an inner side surface of the housing towards the diffuser plate.

In one or more embodiments of the present disclosure, a gap is formed between the panel mounting platform of the housing and the support member, and an edge portion of the diffuser plate is located in the gap.

In one or more embodiments of the present disclosure, the sidewall portion of the housing includes a protrusion connected to the panel mounting platform. The backplate portion, the diffuser plate, and the panel mounting platform are arranged along a first direction, and the protrusion extends beyond the panel mounting platform in the first direction.

In one or more embodiments of the present disclosure, the supporting member includes a first supporting member and a second supporting member. The first supporting member and the second supporting member are disposed at adjacent two sides of the light source. The first supporting member and the second supporting member are engaged with each other.

In one or more embodiments of the present disclosure, the backlight module further includes a reflective sheet disposed on the light source. The reflective incline structure of the supporting member extends obliquely to the reflective sheet and covers an edge portion of the reflective sheet.

In one or more embodiments of the present disclosure, the light source includes a first light-emitting diode and a second light-emitting diode. The reflective sheet has a plurality of openings to expose the first light-emitting diode and the second light-emitting diode. The first light-emitting diode is located between the reflective incline structure and the second light-emitting diode. The first light-emitting diode and the second light-emitting diode are separated by a first distance, and the first light-emitting diode and an end of the reflective incline structure are separated by a second distance. Wherein, the second distance is substantially equal to the first distance.

According to an embodiment of the disclosure, a display device includes the aforementioned backlight module and a display panel. The display panel is disposed on the panel mounting platform of the backlight module.

In one or more embodiments of the present disclosure, the sidewall portion of the housing includes a protrusion connected to the panel mounting platform. The backplate portion, the diffuser plate, and the panel mounting platform are arranged along a first direction. The protrusion is aligned with a display surface of the display panel or extends beyond the display surface in the first direction.

According to an embodiment of the disclosure, a method of assembling a backlight module includes: providing a housing, the housing including a backplate portion, a sidewall portion, and a panel mounting platform, the sidewall portion being arranged along a periphery of the backplate portion, the panel mounting platform being connected to and bent relative to the sidewall portion, such that the panel mounting platform, the sidewall portion, and the backplate portion form a concavity; disposing a light source on the backplate portion of the housing, and at least partially disposing a supporting member in the concavity, so that a gap is formed between the supporting member and the panel mounting platform of the housing, in which the supporting member has a reflective incline structure, and the reflective incline structure extends obliquely to the backplate portion; and loading a diffuser plate and an optical film into the gap from one side of the housing.

In one or more embodiments of the present disclosure, the light source faces a first direction. The step of loading the diffuser plate and the optical film into the gap includes: sliding the diffuser plate and the optical film into the gap between the supporting member and the panel mounting platform along a second direction, in which the second direction is substantially perpendicular to the first direction.

In one or more embodiments of the present disclosure, the method further includes: disposing a reflective sheet on the light source. The step of disposing the supporting member includes: making the reflective incline structure of the supporting member cover an edge portion of the reflective sheet. The reflective incline structure is configured to directly reflect light traveling towards an inner side surface of the housing towards the diffuser plate.

Accordingly, in the backlight module of the present disclosure, the sidewall of the housing is bent to form the panel mounting platform, and the housing is provided with a supporting member to support the diffuser plate and the optical film. With the above structural configurations, the assembly process of the backlight module can be simplified, and the front frame components commonly used in general backlight modules can be omitted, thereby reducing the manufacturing cost. In addition, the supporting member has a reflective incline structure, so there is no need for the reflective sheet to be bent and extended from the backplate to the edge of the housing to form a reflective slope during assembly as in the prior art. In this way, the area of the reflective sheet required by the backlight module is reduced, and the step of forming and bending the reflective slope is omitted in the installation process.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
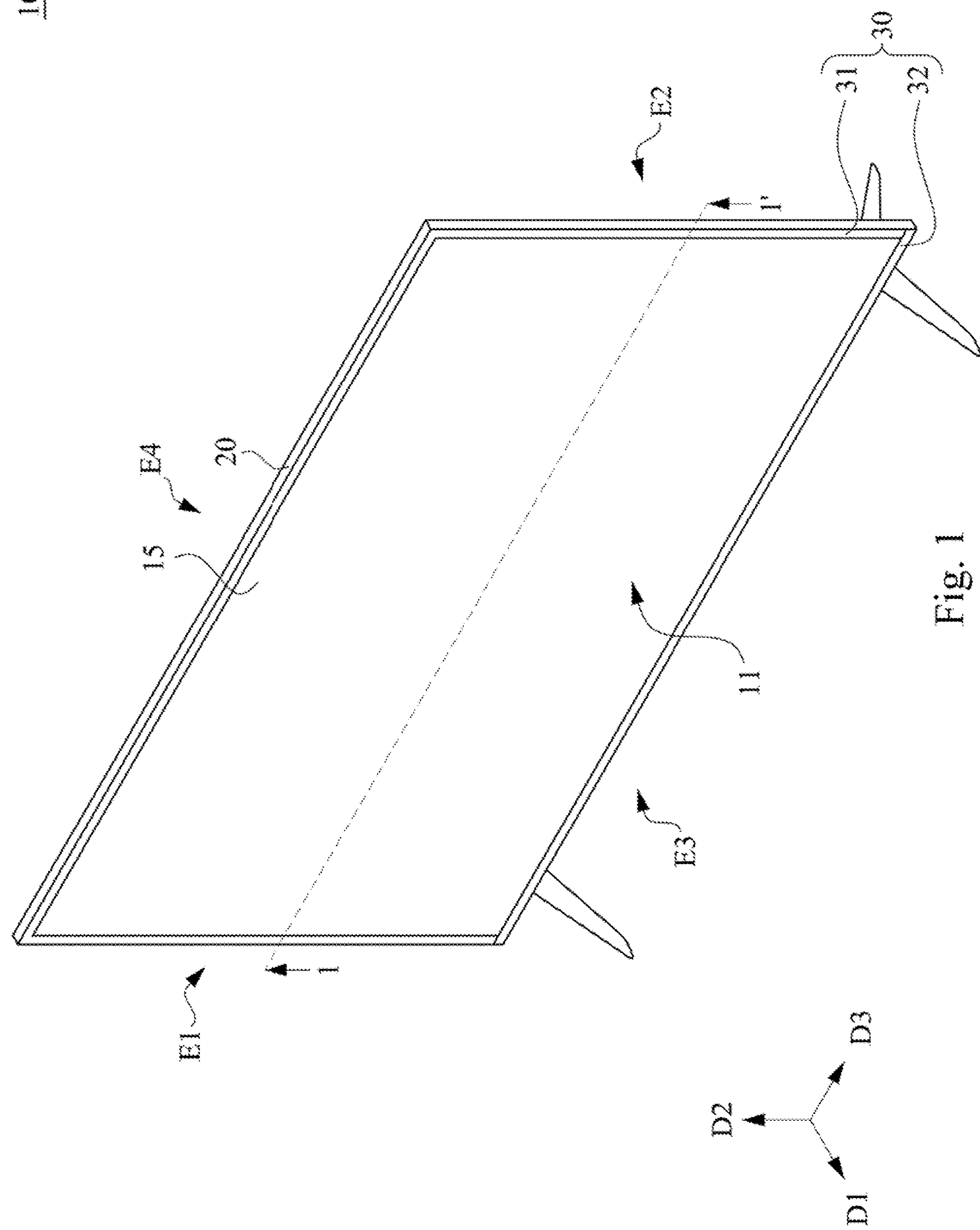
FIG. 1 is a schematic view of a display device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. The display device 10 includes a display panel 15 (e.g., a liquid crystal display panel) and a backlight module 20. The display panel 15 has a first surface 11 and a second surface 12 (referring to FIG. 2) opposite to each other, in which the first surface 11 displays images outward. That is, the first surface 11 is the display surface of the display panel 15. The display panel 15 is disposed on the backlight module 20 with the first surface 11 facing away from the backlight module 20. The backlight module 20 is configured to provide illumination for the display panel 15 so that the display panel 15 can display images.

As shown in FIG. 1, the backlight module 20 includes a housing 30. The display panel 15 is disposed on the housing 30 of the backlight module 20. In some embodiments, the housing 30 includes a first housing part 31 and a second housing part 32. The first housing part 31 has a side opening, and the side opening can be used for accommodating various parts of the backlight module 20 into the accommodating space in the first housing part 31 during assembly. The second housing part 32 is connected to the first housing part 31 and covers the side opening of the first housing part 31.

For the convenience of description, the first direction D1 is defined as the direction in which the first surface 11 of the display panel 15 faces (for example, the normal direction of the first surface 11 in FIG. 1), the second direction D2 is defined as the direction in which the first edge E1 and the second edge E2 of the housing 30 extend (for example, the vertical upward direction in FIG. 1), and the third direction D3 is defined as the direction in which the third edge E3 and the fourth edge E4 of the housing 30 extend (for example, the horizontal rightward direction in FIG. 1). It should be noted that the first direction D1, the second direction D2, and the third direction D3 constitute a coordinate system attached to the display device 10 and the backlight module 20. Therefore, as the orientation of the display device 10 and the backlight module 20 changes (for example, changes to the flat state shown in FIG. 2), the coordinate system turns accordingly. In some embodiments, the first direction D1, the second direction D2, and the third direction D3 are substantially perpendicular to each other.

Figure 2:
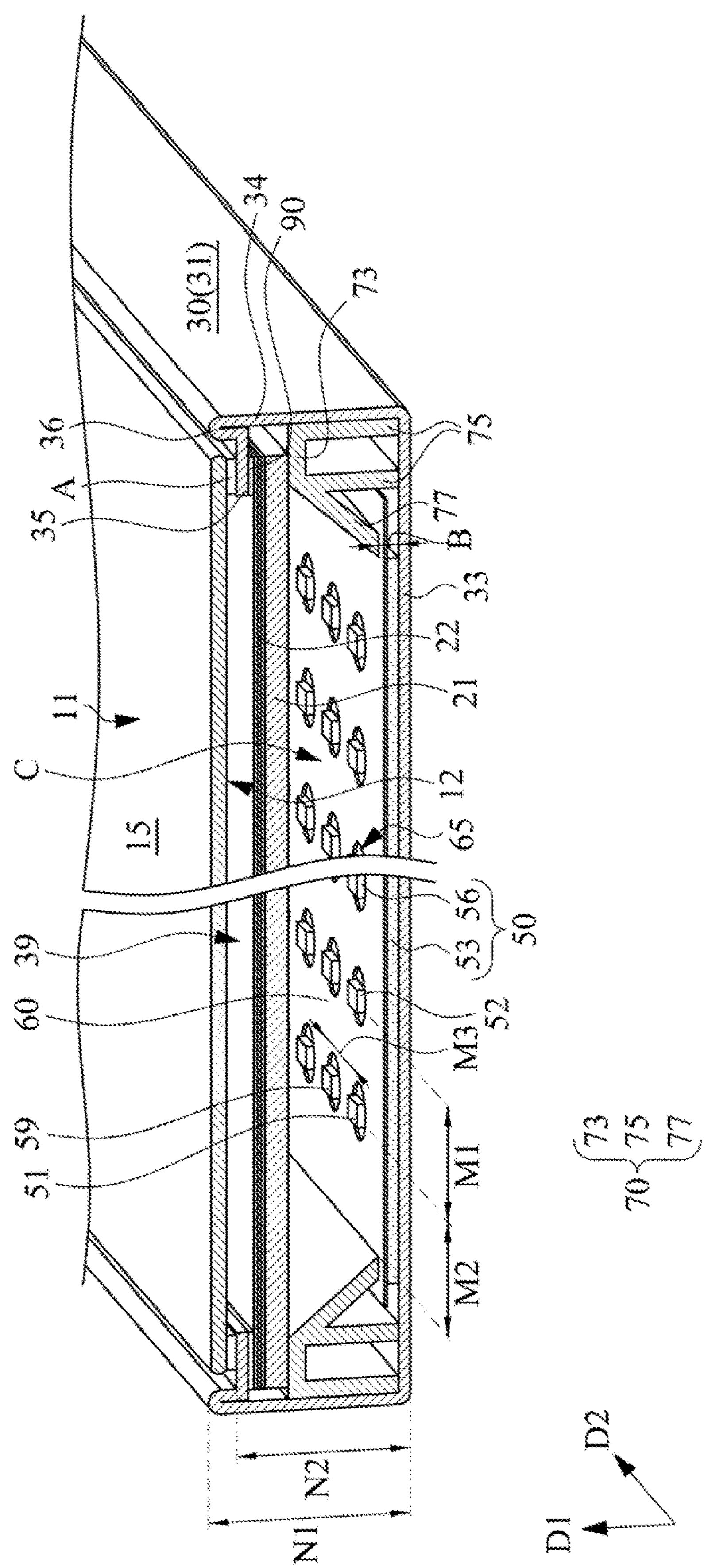
FIG. 2 is a cross-sectional view of a backlight module shown in FIG. 1 taken along line 1-1'.

Reference is made to FIG. 2. The housing 30 has a light outlet 39, and the light outlet 39 faces the display panel 15. The backlight module 20 further includes a light source 50 disposed in the housing 30. The light source 50 is disposed to face the light outlet 39 and faces the first direction D1. In this way, the light source 50 can illuminate the display panel 15 through the light outlet 39 of the housing 30.

As shown in FIG. 2, in some embodiments, the light source 50 is an LED light board (e.g., a Mini LED light board) which includes a circuit board 53 and a plurality of light-emitting diodes 56 disposed on the circuit board 53. In some embodiments, the light source 50 may be fixed on the inner surface of the housing 30 through an adhesive layer (not shown).

As shown in FIG. 2, the backlight module 20 further includes a reflective sheet 60, and the reflective sheet 60 is disposed on the light source 50. Specifically, the reflective sheet 60 covers the circuit board 53 of the light source 50 and has a plurality of openings 65 to expose the light-emitting diodes 56 on the circuit board 53.

As shown in FIG. 2, the housing 30 of the backlight module 20 includes a backplate portion 33, a sidewall portion 34, and a panel mounting platform 35. The backplate portion 33 is configured to support the light source 50 and the reflective sheet 60. The sidewall portion 34 is connected to the backplate portion 33 and is arranged along a periphery of the backplate portion 33. The panel mounting platform 35 is connected to and bent relative to the sidewall portion 34. Specifically, the panel mounting platform 35 is bent inward (for example, the sidewall portion 34 has an outer surface away from the cavity C in the housing 30, and the panel mounting platform 35 extends in a direction away from the outer surface of the sidewall portion 34), such that the panel mounting platform 35, the sidewall portion 34, and the backplate portion 33 form a concavity. The panel mounting platform 35 is configured to support the display panel 15. For example, the display panel 15 may be fixed on the panel mounting platform 35 through the adhesive layer A.

In some embodiments, the housing 30 is a metal housing. The structure in which the backplate portion 33, the sidewall portion 34, and the panel mounting platform 35 are integrally formed may be formed by punching and sheet metal bending. In some embodiments, at least two edges of the housing 30 (e.g., the first edge E1 and the second edge E2, or the third edge E3 and the fourth edge E4) are provided with the panel mounting platform 35. In some embodiments, the four edges (the first edge E1, the second edge E2, the third edge E3, and the fourth edge E4) of the housing 30 are provided with the panel mounting platform 35.

As shown in FIG. 2, the backlight module 20 further includes a diffuser plate 21 and one or more optical films 22 that are stacked. The light source 50, the diffuser plate 21, the optical films 22, and the display panel 15 are arranged along the first direction D1, and the diffuser plate 21 and the optical films 22 are located between the light source 50 and the display panel 15.

As shown in FIG. 2, the backlight module 20 further includes at least one supporting member 70. The supporting member 70 can support edge portions of the diffuser plate 21 and the optical films 22 to position the diffuser plate 21 and the optical films 22 in the housing 30. Specifically, the supporting member 70 is disposed in the housing 30 and is at least partially located within the concavity formed by the backplate portion 33, the sidewall portion 34, and the panel mounting platform 35. The supporting member 70 includes a platform portion 73 on which the diffuser plate 21 and the optical films 22 are directly stacked without other elements (in other words, the diffuser plate 21 contacts the platform portion 73 of the supporting member 70). In some embodiments, the supporting member 70 is a plastic piece. In some embodiments, a fixing structure such as a hanging lug or a buckle may be formed on the platform portion 73 to fix the edge portions of the diffuser plate 21 or the optical films 22.

As shown in FIG. 2, in some embodiments, the supporting member 70 may be disposed at a corner where the backplate portion 33 and the sidewall portion 34 meet. In some embodiments, a gap is formed between the panel mounting platform 35 and the supporting member 70, and the edge portions of the diffuser plate 21 and the optical films 22 are located in the gap between the panel mounting platform 35 and the supporting member 70.

As shown in FIG. 2, in some embodiments, the sidewall portion 34 of the housing 30 includes a protrusion 36. The protrusion 36 is connected to the panel mounting platform 35, and the protrusion 36 extends beyond the panel mounting platform 35 in the first direction D1 (that is, the direction in which the backplate portion 33, the diffuser plate 21, and the panel mounting platform 35 are arranged). In other words, the distance N1 between the distal end of the protrusion 36 and the backplate portion 33 is greater than the distance N2 between the panel mounting platform 35 and the backplate portion 33. In this way, the protrusion 36 can cover the periphery of the display panel 15 and serve as a bezel of the display device 10. Since the housing 30 does not extend to the side of the display panel 15 adjacent to the first surface 11, the user only sees the flat protrusion 36 when viewing the display device 10 from the front, so the display device 10 has the appearance of a narrow bezel.

As shown in FIG. 2, in some embodiments, the protrusion 36 of the housing 30 is aligned with the display surface (i.e., the first surface 11) of the display panel 15 or extends beyond the display surface in the first direction D1. In other words, the distance N1 between the distal end of the protrusion 36 and the backplate portion 33 is greater than or equal to the distance between the display surface of the display panel 15 and the backplate portion 33. In some embodiments, the protrusion 36 is a structure formed by folding a metal plate.

As shown in FIG. 2, in some embodiments, the panel mounting platform 35 has a first surface and a second surface opposite to each other, in which the first surface is away from the supporting member 70 and the diffuser plate 21, and the first surface is the surface that supports the display panel 15. The backlight module 20 further includes a buffer member 90 disposed on the second surface of the panel mounting platform 35. During the process of installing the diffuser plate 21 and the optical films 22 into the housing 30, the provision of the buffer member 90 helps to prevent the diffuser plate 21 and the optical films 22 from being deformed or damaged due to collision or friction with the housing 30 (especially the second surface of the panel mounting platform 35). In some embodiments, the buffer member 90 may include foam, silicone pads, or other soft-textured materials.

As shown in FIG. 2, in some embodiments, the supporting member 70 further includes leg portions 75 having a first end and a second end. The first end is connected to the platform portion 73 of the supporting member 70. The second end abuts against the backplate portion 33 of the housing 30. In some embodiments, the leg portions 75 are a plurality of sheet-like structures separated by a gap. The above configurations make the supporting member 70 more stable and not easily skewed or displaced. In some embodiments, a leg portion 75 of the supporting member 70 abuts against the sidewall portion 34 of the housing 30.

As shown in FIG. 2, in some embodiments, the supporting member 70 further includes a reflective incline structure 77. The reflective incline structure 77 is connected to the platform portion 73, and the reflective incline structure 77 extends obliquely toward the reflective sheet 60 and covers the edge portion of the reflective sheet 60. The reflective incline structure 77 is configured to directly reflect light traveling towards an inner side surface of the housing 30 towards the diffuser plate 21 (that is, there is no other optical element between the reflective incline structure 77 and the diffuser plate 21, and the light can enter the diffuser plate 21 without passing through other optical element after being reflected by the reflective incline structure 77). The provision of the reflective incline structure 77 helps to make the brightness of the backlight module 20 more uniform, and avoids bright areas or dark areas appearing on the display panel 15 when displaying images. On the other hand, since the supporting member 70 is formed with the reflective incline structure 77, it is not necessary to provide other light guide or light reflection elements on the inner side surface of the housing 30, such as the method of folding an inclined surface on the reflective sheet in the prior art. In this way, the area of the reflective sheet required by the backlight module can be reduced, and the step of bending the reflective sheet out of an inclined plane can be omitted in the installation process.

In some embodiments, the reflective incline structure 77 may have a white surface to facilitate direct reflection of light. In some embodiments, the supporting member 70 is formed by white plastic.

As shown in FIG. 2, in some embodiments, in the first direction D1, the height of the reflective incline structure 77 is smaller than the height of the leg portions 75, so that when the supporting member 70 is disposed on the backplate portion 33, there is a gap B between the reflective incline structure 77 and the backplate portion 33. The circuit board 53 of the light source 50 and the edge portion of the reflective sheet 60 are located in the gap B.

As shown in FIG. 2, in some embodiments, the light source 50 includes a first light-emitting diode 51 and a second light-emitting diode 52. The first light-emitting diode 51 is located between the reflective incline structure 77 and the second light-emitting diode 52. The lateral linear distance M1 between the first light-emitting diode 51 and the second light-emitting diode 52 is substantially equal to the lateral linear distance M2 between the first light-emitting diode 51 and the distal end of the reflective incline structure 77. With the above configurations, the light can be reflected at an appropriate angle, so that the brightness of the backlight module 20 can be more uniform.

As shown in FIG. 2, in some embodiments, the light source 50 further includes a third light-emitting diode 59. The first light-emitting diode 51 and the third light-emitting diode 59 are arranged along the direction in which the supporting member 70 extends (the second direction D2). The longitudinal linear distance M3 between the first light-emitting diode 51 and the third light-emitting diode 59 is substantially equal to the lateral linear distance M2 between the first light-emitting diode 51 and the distal end of the reflective incline structure 77.

In some embodiments, the backlight module 20 includes a plurality of supporting members 70. The supporting members 70 are disposed on at least two edges of the housing 30 (e.g., the first edge E1 and the second edge E2, or the third edge E3 and the fourth edge E4). In some embodiments, the backlight module 20 includes four supporting members 70, which are respectively disposed along four edges (e.g., the first edge E1, the second edge E2, the third edge E3, and the fourth edge E4) of the housing 30.

Figure 3:
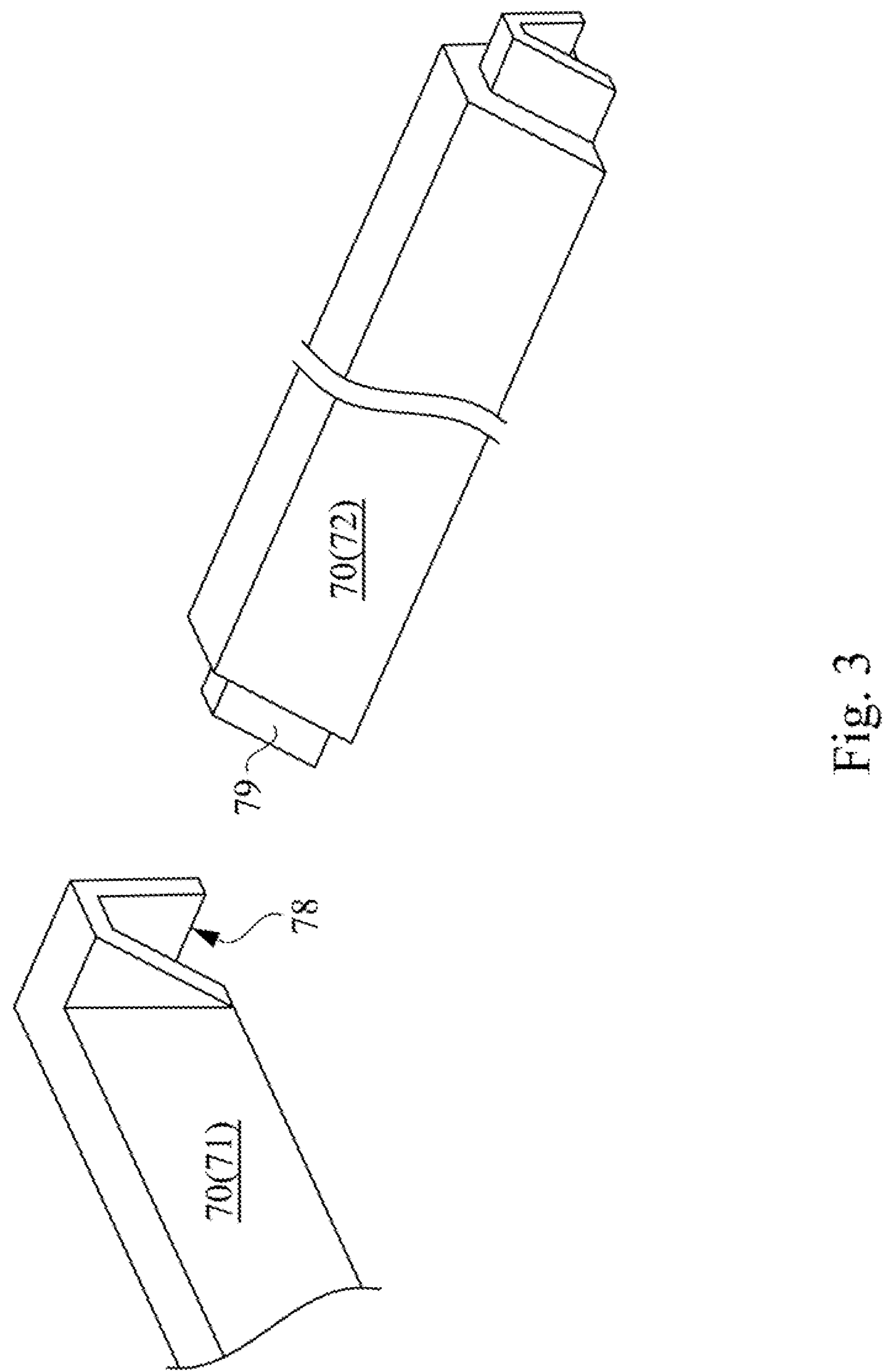
FIG. 3 is an exploded view of a supporting member shown in FIG. 2.

Reference is made to FIG. 3. In some embodiments, the backlight module 20 includes a first supporting member 71 and a second supporting member 72. The first supporting member 71 and the second supporting member 72 are disposed along two adjacent edges of the housing 30 and located on adjacent two sides of the light source 50. The first supporting member 71 and the second supporting member 72 are engaged with each other. In some embodiments, the first supporting member 71 has a concave portion 78, the second supporting member 72 includes a convex portion 79, and the convex portion 79 is configured to be engaged into the concave portion 78. In some embodiments, the backlight module 20 includes four supporting members 70, and any adjacent two of the supporting members 70 are engaged with each other. With the above configurations, the four supporting members 70 can firmly abut against the corners where the backplate portion 33 and the sidewall portion 34 meet, and there is no need to use glue or other fixing means to fix the supporting members 70.

The assembling method of the backlight module 20 will be described below with reference to FIGS. 4 and 5.

Figure 4:
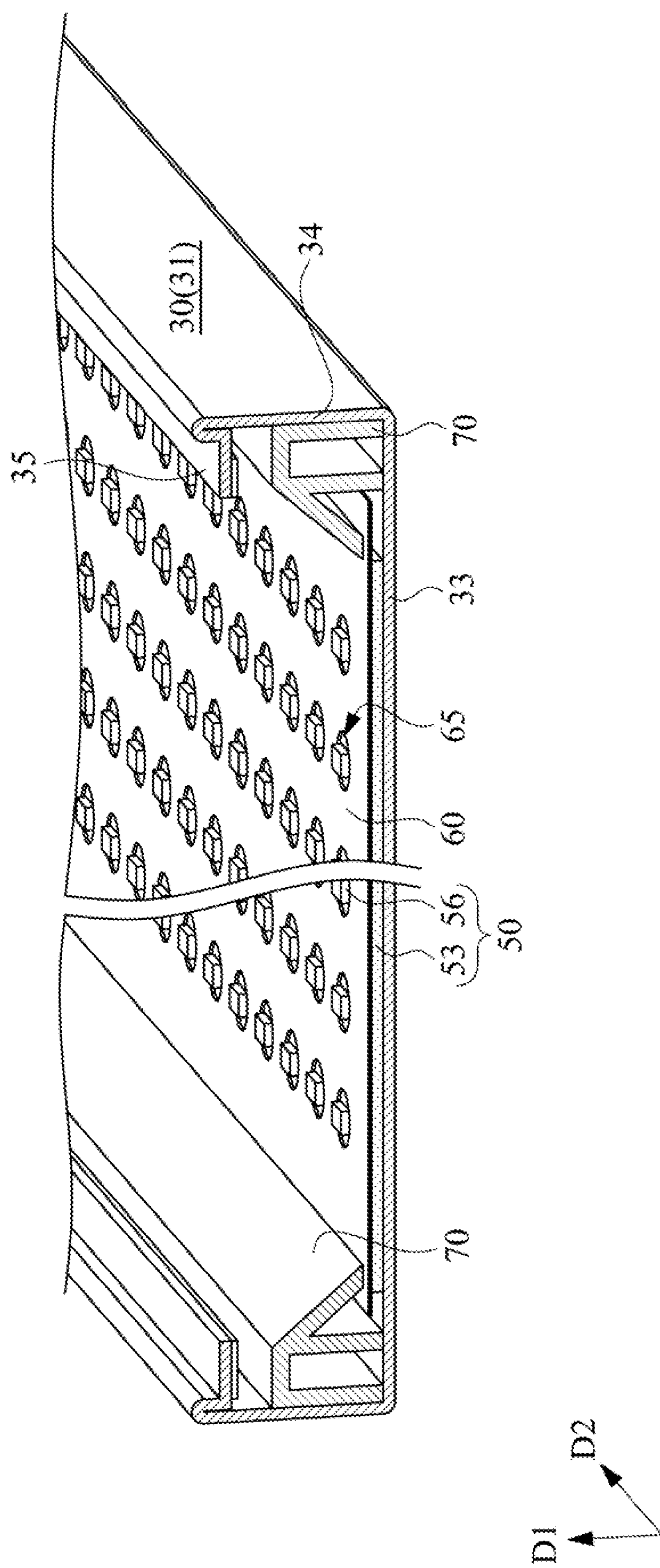
FIGS. 4 and 5 are schematic views of the backlight module shown in FIG. 2 at different assembly stages.

As shown in FIG. 4, first, the housing 30 is placed flat, so that the light outlet 39 of the housing 30 faces upwards. Next, the light source 50, the reflective sheet 60, and the supporting member 70 are disposed in the housing 30, in which the light source 50 faces the light outlet 39 and is disposed on the backplate portion 33 of the housing 30, the reflective sheet 60 is disposed on the light source 50, and the supporting member 70 is at least partially disposed in the concavity formed by the backplate portion 33, the sidewall portion 34, and the panel mounting platform 35 and is located on one side of the light source 50 and the reflective sheet 60. In some embodiments, when disposing the supporting member 70 and the reflective sheet 60, the reflective incline structure 77 of the supporting member 70 covers the edge portion of the reflective sheet 60.

During assembly, the light source 50 and the reflective sheet 60 may be installed into the housing 30 first, and then the supporting member 70 is installed into the housing 30, but the present disclosure is not limited to this assembly sequence. Alternatively, the light source 50, the reflective sheet 60, and the supporting member 70 may be installed in the housing 30 at the same time, or the supporting member 70 may be placed first and the light source 50 and the reflective sheet 60 are placed after. In some embodiments, the assembling method of the backlight module 20 further includes: engaging and fixing two adjacent supporting members 70 (e.g., through the concave and convex structure shown in FIG. 3).

Figure 5:
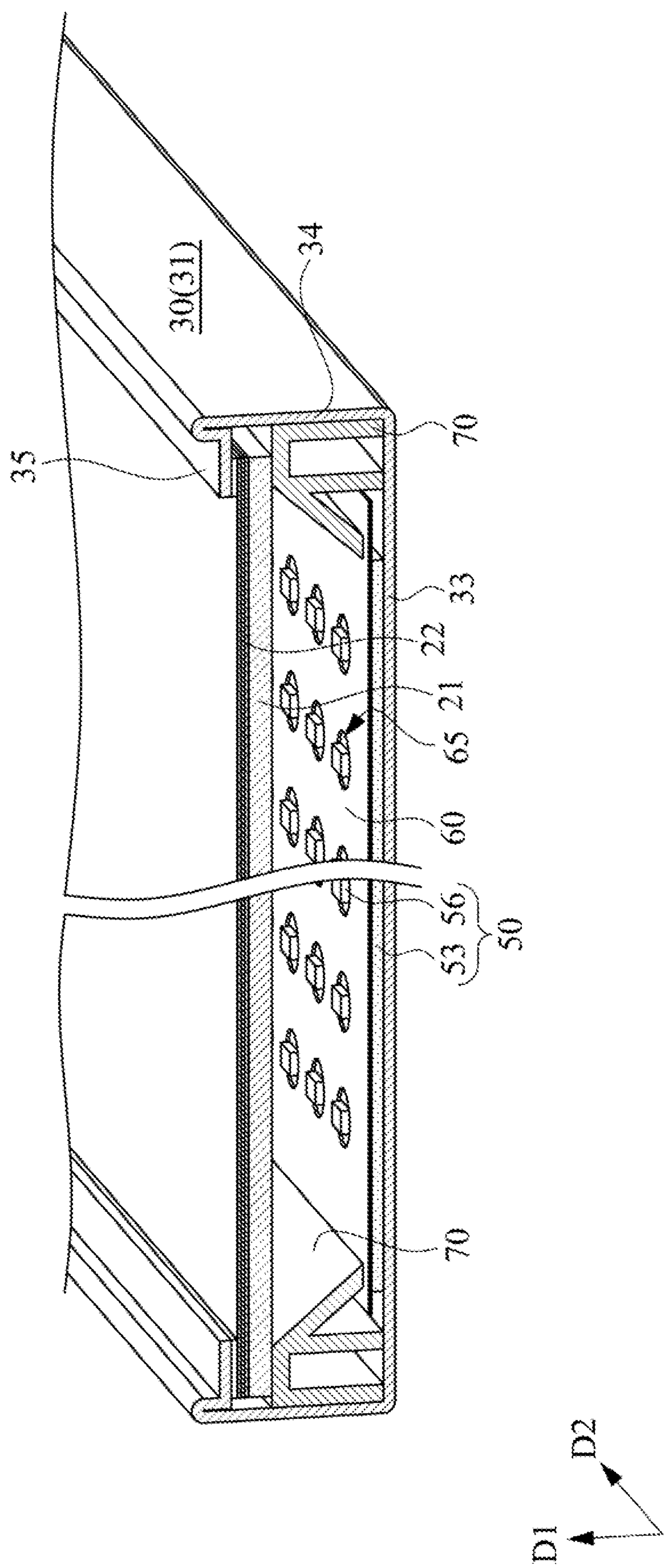

Next, as shown in FIG. 5, the diffuser plate 21 and the optical films 22 are inserted into the gap between the supporting member 70 and the panel mounting platform 35 from one side of the housing 30.

In some embodiments, the step of assembling the diffuser plate 21 and the optical films 22 includes: sliding the diffuser plate 21 and the optical films 22 into the gap between the supporting member 70 and the panel mounting platform 35 along the second direction D2 from the side opening of the first housing part 31 (referring to FIG. 1 and related descriptions above).

In some embodiments, the assembling method of the backlight module 20 further includes: covering the side opening of the first housing part 31 with the second housing part 32 (referring to FIG. 1) after completing the assembly of the diffuser plate 21 and the optical films 22.

Referring back to FIG. 2, after the assembly of the backlight module 20 is completed, the display panel 15 can be fixed on the panel mounting platform 35 of the housing 30 to complete the assembly of the display device 10.

Accordingly, in the backlight module of the present disclosure, the sidewall of the housing is bent to form the panel mounting platform, and the housing is provided with a supporting member to support the diffuser plate and the optical film. With the above structural configurations, the assembly process of the backlight module can be simplified, and the front frame components commonly used in general backlight modules can be omitted, thereby reducing the manufacturing cost. In addition, the supporting member has a reflective incline structure, so there is no need for the reflective sheet to be bent and extended from the backplate to the edge of the housing to form a reflective slope during assembly as in the prior art. In this way, the area of the reflective sheet required by the backlight module is reduced, and the step of forming and bending the reflective slope is omitted in the installation process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:

a housing comprising a backplate portion, a sidewall portion, and a panel mounting platform, the sidewall portion being arranged along a periphery of the backplate portion, the panel mounting platform being connected to and bent relative to the sidewall portion, such that the panel mounting platform, the sidewall portion, and the backplate portion form a concavity, wherein the backplate portion, the sidewall portion, and the panel mounting platform are integrally formed, wherein the backplate portion, the sidewall portion, and the panel mounting platform are provided in a single piece made of metal;

a light source disposed on the backplate portion of the housing;

at least one supporting member disposed in the housing and at least partially located in the concavity;

a diffuser plate; and an optical film directly stacked on the at least one supporting member with the diffuser plate;

wherein the at least one supporting member has a reflective incline structure, and the reflective incline structure is configured to directly reflect light traveling towards an inner side surface of the housing towards the diffuser plate.

2. The backlight module of claim 1, wherein a gap is formed between the panel mounting platform of the housing and the at least one supporting member, and an edge portion of the diffuser plate is located in the gap.

3. The backlight module of claim 1, wherein the sidewall portion of the housing comprises a protrusion, the protrusion is connected to the panel mounting platform, wherein the backplate portion, the diffuser plate, and the panel mounting platform are arranged along a first direction, and the protrusion extends beyond the panel mounting platform in the first direction.

4. The backlight module of claim 1, wherein the at least one supporting member comprises a first supporting member and a second supporting member, the first supporting member and the second supporting member are disposed at adjacent two sides of the light source, and the first supporting member and the second supporting member are engaged with each other.

5. The backlight module of claim 4, wherein the first supporting member has a concave portion, the second supporting member comprises a convex portion, and the convex portion is configured to be engaged into the concave portion.

6. The backlight module of claim 1, further comprising a reflective sheet disposed on the light source, wherein the reflective incline structure of the at least one supporting member extends obliquely to the reflective sheet and covers an edge portion of the reflective sheet.

7. The backlight module of claim 6, wherein the light source comprises a first light-emitting diode and a second light-emitting diode, the reflective sheet has a plurality of openings to expose the first light-emitting diode and the second light-emitting diode, the first light-emitting diode is located between the reflective incline structure and the second light-emitting diode, wherein the first light-emitting diode and the second light-emitting diode are separated by a first distance, the first light-emitting diode and an end of the reflective incline structure are separated by a second distance, and the second distance is substantially equal to the first distance.

8. The backlight module of claim 1, wherein a number of the at least one supporting member is plural, any adjacent two of the supporting members are engaged with each other, and the supporting members abut against corners where the backplate portion and the sidewall portion meet.

9. The backlight module of claim 1, wherein the at least one supporting member comprises a platform portion, and the diffuser plate and the optical film are directly stacked on the platform portion.

10. The backlight module of claim 9, wherein the at least one supporting member further comprises a leg portion having a first end and a second end, the first end is connected to the platform portion, and the second end abuts against the backplate portion.

11. A display device, comprising:

a backlight module, comprising:

a housing comprising a backplate portion, a sidewall portion, and a panel mounting platform, the sidewall portion being arranged along a periphery of the backplate portion, the panel mounting platform being connected to and bent relative to the sidewall portion, such that the panel mounting platform, the sidewall portion, and the backplate portion form a concavity, wherein the backplate portion, the sidewall portion, and the panel mounting platform are integrally formed;

a light source disposed on the backplate portion of the housing;

at least one supporting member disposed in the housing and at least partially located in the concavity;

a diffuser plate;

an optical film directly stacked on the at least one supporting member with the diffuser plate, wherein the at least one supporting member has a reflective incline structure, and the reflective incline structure is configured to directly reflect light traveling towards an inner side surface of the housing towards the diffuser plate; and a reflective sheet disposed on the light source, wherein the reflective incline structure of the at least one supporting member extends obliquely to the reflective sheet and covers an edge portion of the reflective sheet; and a display panel disposed on the panel mounting platform of the backlight module.

12. The display device of claim 11, wherein the sidewall portion of the housing comprises a protrusion, the protrusion is connected to the panel mounting platform, wherein the backplate portion, the diffuser plate, and the panel mounting platform are arranged along a first direction, and the protrusion is aligned with a display surface of the display panel or extends beyond the display surface in the first direction.

13. A method of assembling a backlight module, comprising:

providing a housing, the housing comprising a backplate portion, a sidewall portion, and a panel mounting platform, the sidewall portion being arranged along a periphery of the backplate portion, the panel mounting platform being connected to and bent relative to the sidewall portion, such that the panel mounting platform, the sidewall portion, and the backplate portion form a concavity, wherein the backplate portion, the sidewall portion, and the panel mounting platform are integrally formed, wherein the backplate portion, the sidewall portion, and the panel mounting platform are provided in a single piece made of metal;

disposing a light source on the backplate portion of the housing, and at least partially disposing a supporting member in the concavity, so that a gap is formed between the supporting member and the panel mounting platform of the housing, wherein the supporting member has a reflective incline structure, and the reflective incline structure extends obliquely to the backplate portion; and loading a diffuser plate and an optical film into the gap from one side of the housing.

14. The method of claim 13, wherein the light source faces a first direction, and the step for loading the diffuser plate and the optical film into the gap comprises:

sliding the diffuser plate and the optical film into the gap between the supporting member and the panel mounting platform along a second direction, wherein the second direction is substantially perpendicular to the first direction.

15. The method of claim 13, further comprising:

disposing a reflective sheet on the light source;

wherein the disposing the supporting member comprises making the reflective incline structure of the supporting member cover an edge portion of the reflective sheet, the reflective incline structure being configured to directly reflect light traveling towards an inner side surface of the housing towards the diffuser plate.

* * * * *